(12) United States Patent
Caliskan et al.

(10) Patent No.: US 7,275,785 B2
(45) Date of Patent: Oct. 2, 2007

(54) REAR SUBFRAME ATTACHMENT MOUNT FOR HYDROFORMED FRAME

(75) Inventors: Ari Caliskan, Canton, MI (US); Dean Gericke, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 11/148,027

(22) Filed: Jun. 8, 2005

(65) Prior Publication Data

US 2007/0138840 A1    Jun. 21, 2007

(51) Int. Cl.
*B62D 21/02* (2006.01)

(52) U.S. Cl. .................. 296/204; 296/203.01; 296/205; 296/29

(58) Field of Classification Search ........... 296/203.01, 296/203.02, 203.04, 204, 205, 29, 30, 187.08, 296/187.09, 187.11, 193.07–193.09
See application file for complete search history.

(56) References Cited

U.S. PATENT DOCUMENTS

| | | | |
|---|---|---|---|
| 1,697,498 | A | 1/1929 | Fageol |
| 2,248,344 | A | 7/1941 | Epps |
| 2,270,533 | A | 1/1942 | Knutte |
| 4,986,597 | A | 1/1991 | Clausen |
| 5,215,343 | A | 6/1993 | Fortune |
| 6,003,935 | A * | 12/1999 | Kalazny ..................... 296/204 |
| 6,022,070 | A | 2/2000 | Ashina et al. |
| 6,302,478 | B1 | 10/2001 | Jaekel |
| 6,378,444 | B1 * | 4/2002 | Dastas et al. ............... 105/396 |
| 6,398,292 | B2 * | 6/2002 | Tsuruta et al. ......... 296/187.09 |
| 6,434,907 | B1 * | 8/2002 | Simboli ..................... 52/731.6 |
| 6,435,584 | B1 * | 8/2002 | Bonnville .................. 296/35.1 |
| 6,945,591 | B2 * | 9/2005 | Durand ..................... 296/183.1 |
| 6,948,767 | B2 * | 9/2005 | Makita et al. ......... 296/187.09 |
| 6,991,284 | B2 * | 1/2006 | Kim ........................... 296/204 |
| 7,213,873 | B2 * | 5/2007 | Murata et al. ............. 296/204 |
| 7,216,924 | B2 * | 5/2007 | Li et al. ................. 296/187.12 |
| 2006/0284449 | A1 * | 12/2006 | Miyahara ..................... 296/204 |
| 2007/0138838 | A1 * | 6/2007 | Caliskan et al. ............ 296/204 |

* cited by examiner

*Primary Examiner*—D. Glenn Dayoan
*Assistant Examiner*—Greg Blankenship
(74) *Attorney, Agent, or Firm*—Gigette Bejin; Miller Law Group, PLLC

(57) ABSTRACT

An attachment mount apparatus connects a subframe component to the lower frame midrail structure for an automotive vehicle that is formed from a pair of tubular members manufactured through a hydroforming process. The two tubular members are formed with a pair of opposing semi-cylindrical depressions to receive a cylindrical mounting member internally of the frame structure. One of the semi-cylindrical depressions and the corresponding outer wall of the tubular member are pierced to receive the cylindrical mount and a mounting plate. The opposing semi-cylindrical depression serves as a stop to locate the cylindricalal mount along the centerline of the frame structure. The mounting plate spans the entire frame structure and is supported on four wall thicknesses to provide a stable mount structure for subframe components. The cylindrical mounting member is threaded to receive a fastener for the mounting of the subframe member.

13 Claims, 4 Drawing Sheets

REAR SUBFRAME ATTACHMENT MOUNT FOR HYDROFORMED FRAME

FIELD OF THE INVENTION

This invention relates to lower frame midrails for an automotive vehicle and, more particularly, to a mount assembly for attaching subframe structures to a hydroformed midrail assembly formed from a pair of side-by-side tubular members.

BACKGROUND OF THE INVENTION

Lower frame midrails in an automotive vehicle support the central part of an automotive chassis and provide a cantilevered support for the rear bumper assembly. Conventionally, the rear bumper assembly would include a transverse bumper beam, lower frame rails and appropriate attachment brackets for connecting the bumper beam to the lower frame rails and the lower frame rails to the midrails. The rear shock tower support members are mounted on top of the midrails, conventionally in a cantilevered manner off of a single fabricated rail structure.

Conventional automotive frame designs are formed from fabricated steel components that are provided with many reinforcements affixed to the frame to accommodate the attachment of subframe components to the frame structure. The reinforcements permit the localized loads coming from subframe structures or other secondary structures to be transmitted into the frame structure without distortion of the frame. The formation of frame structure, such as the lower midrail frame structure from tubular hydroformed components, provides unique opportunities for the support and mounting of subframe components from a hydroformed frame structure.

Conventional clamps and brackets for attaching apparatus to frame structure can be found in U.S. Pat. No. 1,697,498, issued to Rollie B. Rageol on Jan. 1, 1929; and in U.S. Pat. No. 2,248,344, issued to Louis J. Epps on Jul. 8, 1941, where structure is mounted to tubular bumper components; in U.S. Pat. No. 2,270,533, issued to Joseph F. Knutte on Jan. 20, 1942; and in U.S. Pat. No. 5,215,343, issued to William C. Fortune on Jun. 1, 1993, where components are mounted to non-tubular bumper components. Clamping frame components together with couplings that become welded to the tubular frame members is taught in U.S. Pat. No. 6,022,070, issued to Toshiro Ashina, et al on Feb. 8, 2000.

Hollow tubular members are used as reinforcements for an automotive frame structure in U.S. Pat. No. 4,986,597, issued to Edvin L. Clausen on Jan. 22, 1991. Hydroformed automotive frame components are disclosed in U.S. Pat. No. 6,302,478, issued to Federico G. Jackel, et al on Oct. 16, 2001. In the Jackel frame structure, the hydroformed components are manufactured with flanges that will at least partially encompass a frame or subframe part to be joined thereto to facilitate the welding of the two components through the interaction with the flange components.

It would be desirable to provide an apparatus for the mounting of subframe structural components to the lower frame midrails. Since the lower frame midrails are to be formed from a pair of vertically oriented, but horizontally disposed tubular components, a unique apparatus to be particularly adaptable for use in conjunction with the lower frame rail structure of an automobile that are particularly adaptable to manufacturing through hydroforming processes and which can be utilized to provide a stable support for the rear shock tower.

SUMMARY OF THE INVENTION

It is an object of this invention to overcome the aforementioned disadvantages of the known prior art by providing an attachment mount to be supported by a lower frame midrail structure that is formed from a pair of tubular members.

It is a feature of this invention that the lower frame midrail structure can be formed through hydroforming processes to enhance manufacturing efficiencies.

It is an advantage of this invention that the hydroformed lower frame midrail structure is formed to receive a cylindrical subframe mount structure within the interior of the dual tube midrail structure.

It is still another advantage of this invention that the attachment mount cans be welded to both of the tubular members of the lower frame midrails to increase stability of the subframe mount.

It is still another feature of this invention that the subframe mounting structure is supported by both outer walls of the hydroformed lower frame midrail structure and by the interior adjoining walls thereof It is a further feature of this invention that the interior walls of the dual tube lower frame midrail structure is formed with a semi-cylindrical indentation to receive the cylindrical subframe mount along the centerline of the midrail structure.

It is a further advantage of this invention that an opening is pierced through the midrail structure to permit the attachment mount to be inserted into the midrail structure.

It is another feature of this invention that one tubular member of the midrail structure is pierced to permit the insertion of a cylindrical subframe mount, while the opposing semi-cylindrical depression serves as a stop for the lateral movement of the attachment mount for accurate placement of the mount at the centerline of the midrail structure.

It is still another feature of this invention that the cylindrical member of the attachment mount is threaded to receive a fastener attaching the subframe component to the midrail structure.

It is still another advantage of this invention that the attachment mount apparatus can be utilized between any hydroformed tubular members that are joined together to form a component to which a subcomponent needs to be attached.

It is yet another feature of this invention that the attachment mount apparatus eliminates reinforcement stampings conventionally required for use in mounting subcomponents to an automotive frame structure.

It is yet another advantage of this invention that the support of the mounting plate of the subframe mount apparatus on four wall thicknesses in the dual tube frame structure should reduce weight, yet provide for a stiffer support for the subcomponent on the frame structure.

It is another object of this invention to provide an attachment mount apparatus for use with a dual tube frame structure that is durable in construction, inexpensive of manufacture, facile in assemblage, and simple and effective in use.

These and other objects, features and advantages are accomplished according to the instant invention by providing an attachment mount apparatus for connecting a subframe component to the lower frame midrail structure for an automotive vehicle that is formed from a pair of tubular members manufactured through a hydroforming process. The two tubular members are formed with a pair of opposing semi-cylindrical depressions to receive a cylindrical mounting member internally of the frame structure. One of the semi-cylindrical depressions and the corresponding outer wall of the tubular member are pierced to receive the cylindrical mount and a mounting plate. The opposing semi-cylindrical depression serves as a stop to locate the cylindrical mount along the centerline of the frame structure. The mounting plate spans the entire frame structure and is supported on four wall thicknesses to provide a stable mount structure for subframe components. The cylindrical mounting member is threaded to receive a fastener for the mounting of the subframe member.

BRIEF DESCRIPTION OF THE DRAWINGS

The advantages of this invention will become apparent upon consideration of the following detailed disclosure of the invention, especially when taken in conjunction with the accompanying drawings wherein:

FIG. 5 is an enlarged bottom perspective view of a portion of the lower frame midrail to depict the opening into the midrail to engage the mounting apparatus;

DETAILED DESCRIPTION OF THE PREFERRED EMBODIMENT

Figure 1:
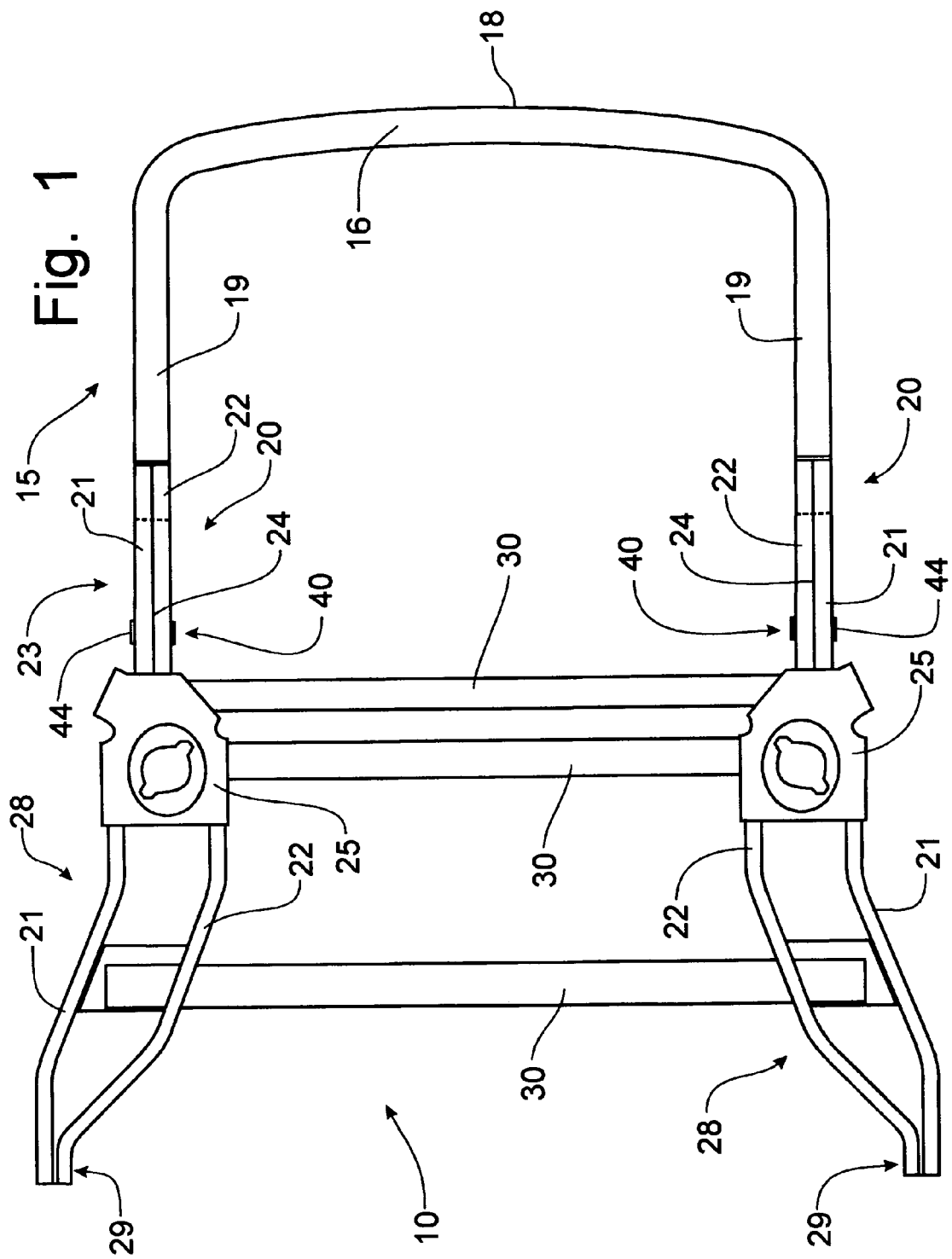
FIG. 1 is a top plan view of the single component bumper and lower frame rail structure to form the rear frame structure for an automobile incorporating the principles of the instant invention.
Figure 2:
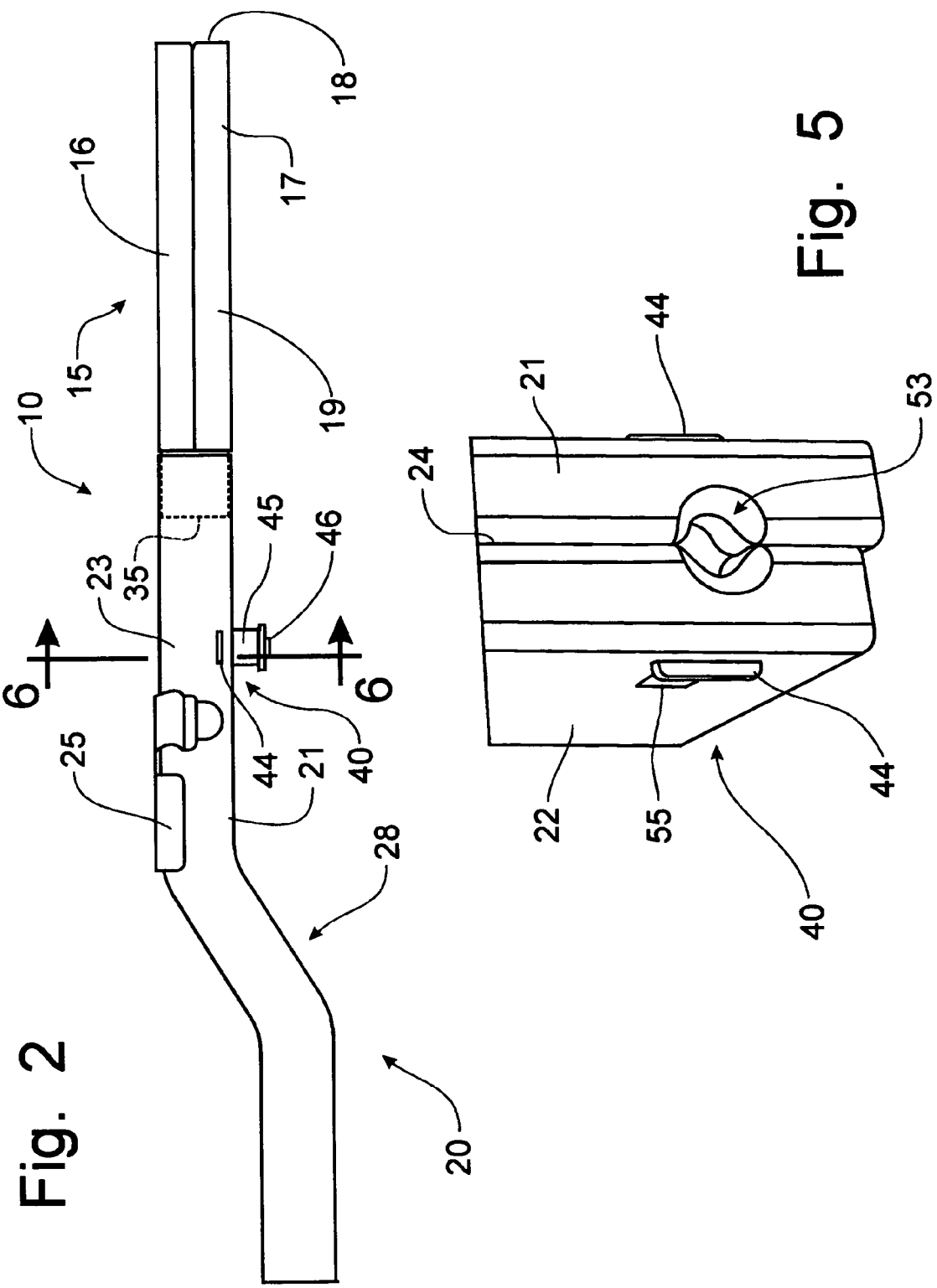
FIG. 2 is a side elevational view of the bumper and lower frame rail structure depicted in FIG. 1.

Referring to FIGS. 1 and 2, a bumper and lower frame rail, including a shock tower support, forming a part of the rear end of an automobile frame and incorporating the principles of the instant invention, can best be seen. The frame 10 of the automobile is preferably formed from hydroformed tubular members. Such tubular members can be spot-welded and/or MiG-welded to form an integral frame assembly for the rear end of a vehicle.

Hydroforming is a process by which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. One skilled in the art will readily recognize that some MiG-welding will be required in areas where access holes are detrimental to the integrity of the frame structure. Preferably, such MiG-welding processes are performed at a sub-assembly or at a supplier level.

In the automotive rear end frame 10 depicted in the drawings, the bumper 15 is formed from welded hydroformed members. Similarly, the lower frame rails 20, which connect to the bumper 15 and project forwardly therefrom, are formed from tubular hydroformed members. The shock tower support member 25 is preferably a stamping that is formed into a specific shape and mounted on the lower frame rails 20, as is described in greater detail below.

The lower frame rail 20 is formed from two hydroformed tubular members 21, 22 that have corresponding first longitudinally extending portions 23 that are welded together at the rearward most end of the members 21, 22 preferably by MiG-welding along the generally horizontal seam between the members 21, 22. As is best seen in FIGS. 1 and 3-6, the lower frame rail structure 20 would then have an internal vertical web 24 formed from the adjacent sidewalls of the two tubular members 21, 22, oriented as an exterior member 21 and an interior member 22. The internal web 24 substantially increases the strength and stiffness of the lower frame rail 20, compared to a conventional tubular member.

The longitudinally extending portions 23 are positioned for connection to the bumper 15. Forwardly of the longitudinally extending portions 23, the two tubular members 21, 22 diverge to define a divergent portion 28 to provide a lateral spacing between the two members 21, 22. At this point of divergence, the shock tower support 25 is affixed, preferably by welding, to the top of the two tubular members 21, 22. The tubular members 21, 22 converge into a second longitudinally extending portion 29 forward of said divergent portion 28.

Figure 3:
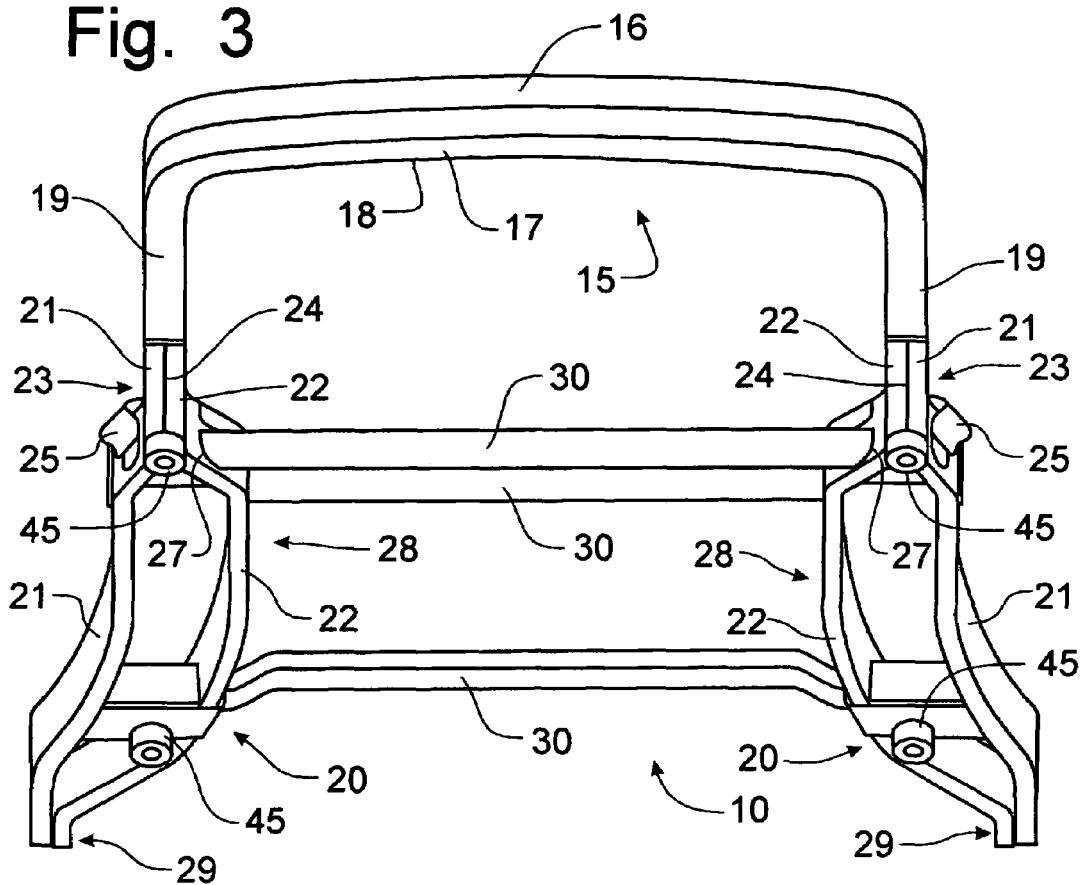
FIG. 3 is a bottom perspective view of the bumper and lower frame rail structure shown in FIG. 1.
Figure 4:
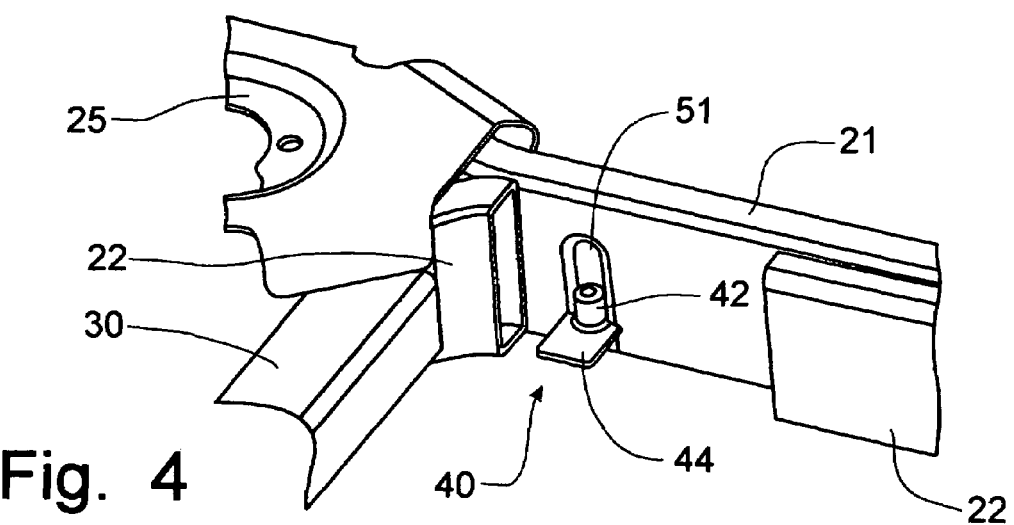
FIG. 4 is an enlarged perspective detail view of a portion of the lower frame midrail with a portion of one of the tubular members forming the midrail being broken away to better see the mounting apparatus.
Figure 6:
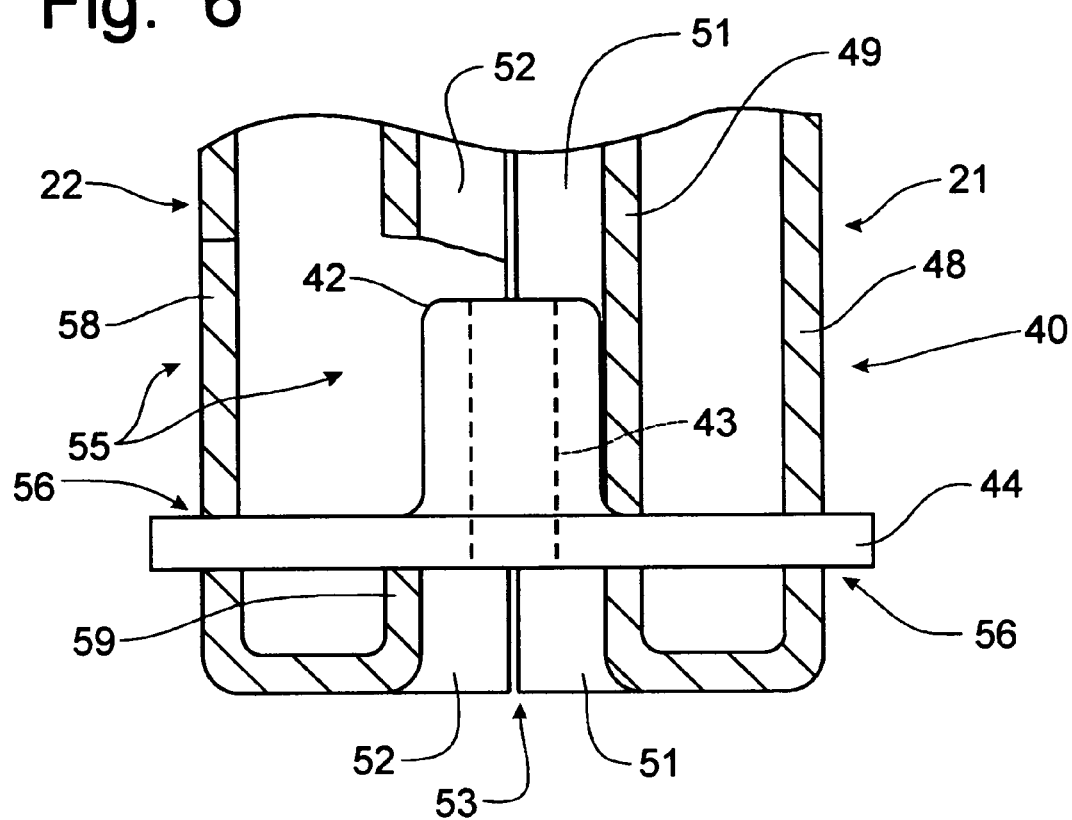
FIG. 6 is an enlarged partial cross-sectional view of the lower frame midrail taken along lines 6-6 of FIG. 2 to show an internal elevational view of the mounting apparatus incorporating the principles of the instant invention.
Figure 7:
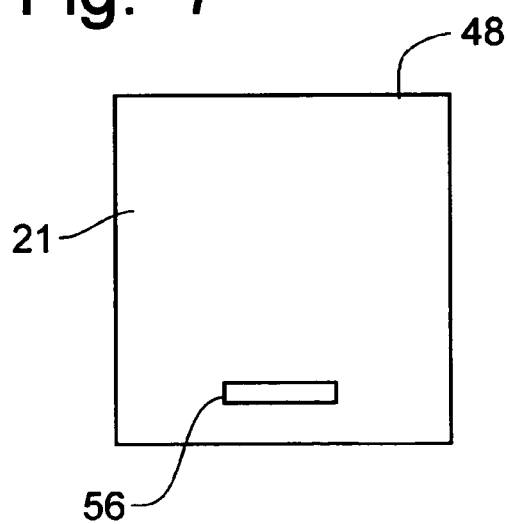
FIG. 7 is an elevational view of a portion of the exterior side of the lower frame midrail at the mounting apparatus.
Figure 8:
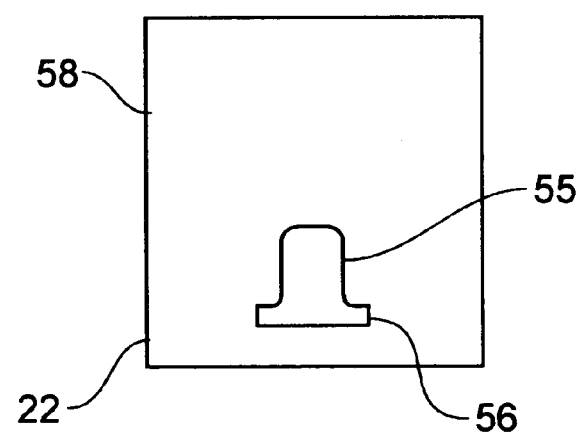
FIG. 8 is an elevational view of a portion of the interior side of the lower frame midrail at the mounting apparatus.

Preferably, as is best seen in FIG. 3, at least one of the cross frame members 30 adjacent the shock tower support 25 will pass through appropriate openings 27 in the interior tubular member 22 to engage the exterior tubular member 21 to permit welding between both members 21, 22 and the cross frame member 30. Such fabrication will add cross-vehicle stiffness to the frame 10, as well as provide a robust joint at the shock tower support 25. Preferably, the interior and exterior tubular members 21, 22 converge so that the lower frame rail 20 will extend forwardly with a central vertical web 24, as is shown with respect to the rearward longitudinally extending portions 23.

The bumper 15 can also be constructed from two hydroformed members 16, 17, with the upper tubular member 16 being located on top of the lower tubular member 17. Preferably both tubular bumper members 16, 17 are shaped substantially identically with a rearwardly positioned bight portion 18 and opposing mounting legs 19. The two tubular members 16, 17 can be MiG-welded along the generally horizontally extending seam therebetween to form a dual-celled bumper 15. Formation of the tubular members through the hydroforming process permits the introduction of deformation triggers (not shown), i.e. Fold points to direct the deformation of the bumper in a prescribed manner when encountering an impact load.

As best seen in FIG. 1, the forward ends of the mounting legs 19 are formed to mate with the dual tube lower frame rails 20. Each tubular member 16, 17 is formed with a reduced-sized terminal end 35 that can fit between the interior and exterior sidewalls of the lower frame rails 20, whereas the remainder of the mounting legs 19 are formed to correspond geometrically with the longitudinally extending portions 23 of the lower frame rails 20. As a result, the insertion of the reduced-sized terminal end 35 into the rearward ends of the lower frame rails 20 results in a generally uniformly shaped frame 10 with the overall width and depth of the bumper structure 15 being substantially equal to the overall width and depth of the lower frame rails 20.

The lower frame rail 20 is also utilized to support various subframe components that have to be attached to the frame rails for proper support thereof. Accordingly, as is best seen in all the drawings, but particularly in FIGS. 5-8, the lower frame rail 20 is manufactured to incorporate a subframe attachment mount 40 that is positioned at the centerline of the lower frame rail 20, as will be described in greater detail below. The subframe attachment mount 40 is formed with a flat mounting plate 44 with a cylindrical mounting member 42 projecting perpendicularly thereto. The center of the cylindrical mounting member 42 is preferably formed with a threaded bore 43.

To receive the subframe attachment member 40, each interior wall 49, 59 defining the internal vertical web 24 of the tubular members 21, 22 is formed with a semi-cylindrical depression 51, 52 that, when placed adjacent one another form a cylindrical pocket or cavity that is sized to receive the cylindrical mounting member 42. The formation of the semi-cylindrical depressions 51, 52 also causes the interior walls 49, 59 to be shaped in a semi-circular configuration to provide a stable support for the mounting plate 44. At the same time the semi-cylindrical depressions 51, 52 are being formed, an access opening 53 is formed on the lower surface of the lower frame rails 20 to be in alignment with the threaded bore 43 into the mounting member 42 to permit the engagement of the mounting member 42 with a fastener 46.

To allow for access of the mounting member 42 and the mounting plate 44 into the assembled lower frame rail 20, the exterior wall 58 and the interior wall 52 are formed or pierced with an opening 55 to accommodate the passage of the cylindrical member 42 into the interior of the lower frame rail 20. By only opening the exterior wall and the interior wall of the interior tubular member 22 for the passage of the subframe mounting member 42, the cylindrical mounting member 42 can be seated against the semi-cylindrical depression 51 formed into the exterior tubular member 21 to serve as a stop for positioning the mounting member 42.

An additional opening 56 is formed in both of the tubular members 21, 22 for the passage of the mounting plate 44. In the interior tubular member 22, the opening 56 is formed with the opening 55 to define a single opening for the passage of the subframe mount 40. The opening 56 for the mounting plate 44, however, extends through the semi-cylindrical depression 51 formed in the inner wall 49 and through the outer wall 48 so that the mounting plate 44 can be supported on each of the four walls 48, 49, 58, 59 of the lower frame midrail 20, and welded to at least the outer walls 48, 58 to secure the mounting plate 44 and affixed mounting member 42 to the lower frame midrail structure 20.

The subframe mount 40 is not limited in use to the lower frame midrail structure 20, but can be utilized in other frame configurations in which a pair of members can be formed with semi-cylindrical depressions to seat the cylindrical mounting member 42 and the support of the mounting plate 44 can be spread over at least two supports, such as the outer walls 48, 58.

In use, the subframe mount 40 is assembled as described above and welded into position on the frame structure 20. The subframe assembly to be supported from the frame 20 can then be attached to the frame structure 20 by a fastener 46 that passes through an external support member 45 and extends through an opening in the mounting plate 44 to engage the threaded bore 43 of the cylindrical member 42.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention what is claimed is:

1. A subframe mount for an automotive frame member having a pair of tubular members oriented adjacent one another to position respective inner walls of the respective tubular members adjacent one another, said tubular members also having opposing outer walls spaced from said inner walls, comprising:
    a cylindrical mounting member affixed to a mounting plate and projecting perpendicularly thereto; and
    said cylindrical member being received within a cylindrical pocket formed into the inner walls of said tubular members, said pocket having an opening accessible from externally of said frame member for insertion of a fastener into said cylindrical mounting member.

2. The subframe mount of claim 1 wherein said tubular members are formed with a first opening through said inner and outer walls for the passage of said mounting plate through said tubular members.

3. The subframe mount of claim 2 wherein said pocket is formed from a semi-cylindrical depression formed into each respective inner wall of said tubular members.

4. The subframe mount of claim 3 wherein the semi-cylindrical depression in one of said tubular members is formed with a second opening for the passage of said cylindrical mounting member into said pocket, the outer wall of said one tubular member also being formed with said second opening to permit the passage of said cylindrical mounting member from outside said frame member laterally into said pocket.

5. The subframe mount of claim 4 wherein said first and second openings are formed together in said one tubular member so that said cylindrical mounting member and said mounting plate can laterally pass through said one tubular member.

6. The subframe mount of claim 5 wherein said mounting plate is supported on said inner and outer walls of said tubular members, said mounting plate being welded to said outer walls of said tubular members to affix said subframe mount to said frame member.

7. A lower frame rail assembly for an automobile, comprising:
    an interior tubular member having an inner wall and an outer wall;
    an exterior tubular member having an inner wall and an outer wall with height and width dimensions substantially equal to said interior tubular member, said interior and exterior tubular members being welded together to form a longitudinally extending portion with said inner walls being position adjacent one another to define a generally vertically oriented internal web;
    each of said inner walls being formed with a semi-cylindrical depression alignable to define a cylindrical pocket within said internal web;

a mounting plate supported on said inner and outer walls of said tubular members; and a cylindrical mounting member positioned within said cylindrical pocket and being supported on said mounting plate to distribute any loads encountered thereby across said inner and outer walls.

8. The lower frame rail assembly of claim 7 wherein inner and outer walls are formed with a first opening to permit the passage of said mounting plate for support on each of said inner and outer walls.

9. The lower frame rail assembly of claim 8 wherein one of said semi-cylindrical depressions is formed with a second opening to permit the lateral passage of said cylindrical mounting member into said pocket, the outer wall corresponding to said one semi-cylindrical depression also having a second opening formed therein to permit the lateral passage of said cylindrical mounting member into said pocket.

10. The lower frame rail assembly of claim 9 wherein said cylindrical mounting member is affixed to said mounting plate.

11. The lower frame rail assembly of claim 10 wherein said mounting plate is affixed to said outer walls of said tubular members.

12. The lower frame rail assembly of claim 11 wherein said pocket is formed with an opening to permit insertion of a fastener from externally of said tubular members into a threaded bore of said cylindrical mounting member.

13. The lower frame rail assembly of claim 12 wherein said one semi-cylindrical depression and corresponding outer wall into which said second openings are formed are part of said interior tubular member, the outer wall of said exterior tubular member only having said first opening formed therein.

* * * * *

UNITED STATES PATENT AND TRADEMARK OFFICE
CERTIFICATE OF CORRECTION

PATENT NO. : 7,275,785 B2  
APPLICATION NO. : 11/148027  
DATED : October 2, 2007  
INVENTOR(S) : Ari Caliskan and Dean Gericke It is certified that error appears in the above-identified patent and that said Letters Patent is hereby corrected as shown below:

Title page Insert

The names of the Assignees of this patent are:

Ford Global Technologies, LLC of Dearborn, MI

Vari-Form, Inc. of Warren, MI

Signed and Sealed this

Nineteenth Day of August, 2008

JON W. DUDAS  
*Director of the United States Patent and Trademark Office*